United States Patent
Butler et al.

(10) Patent No.: US 8,607,213 B2
(45) Date of Patent: Dec. 10, 2013

(54) SCORM MANIFEST RECONCILIATION

(75) Inventors: Jason Matthew Butler, Raleigh, NC (US); Joseph Thomas Casey, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 2246 days.

(21) Appl. No.: 11/294,099

(22) Filed: Dec. 5, 2005

(65) Prior Publication Data

US 2007/0143751 A1 Jun. 21, 2007

(51) Int. Cl.
*G06F 9/44* (2006.01)
(52) U.S. Cl.
USPC .......................................................... 717/168
(58) Field of Classification Search
USPC .......................................... 717/168–178, 111
See application file for complete search history.

(56) References Cited

U.S. PATENT DOCUMENTS

| | | | |
|---|---|---|---|
| 6,493,768 B1 * | 12/2002 | Boutcher | 709/330 |
| 7,240,336 B1 * | 7/2007 | Baker | 717/135 |
| 7,296,019 B1 * | 11/2007 | Chandrasekar et al. | 707/6 |
| 7,526,762 B1 * | 4/2009 | Astala et al. | 717/171 |
| 2004/0003390 A1 * | 1/2004 | Canter et al. | 717/178 |
| 2006/0059165 A1 * | 3/2006 | Bosloy et al. | 707/10 |

FOREIGN PATENT DOCUMENTS

WO 2004-031949 A2 4/2004

OTHER PUBLICATIONS

Asmus Freytag, "Proposed Draft Unicode Technical Report #30, Character Foldings," May 8, 2002, Version 1.0, UNICODE, http://unicode.org/reports/tr30/tr30-1.html.*
"Design and Development of the Web-courseware According to the Learning Object Theory," China Academic Journal Electronic Publishing House, 1994-2009, http://www.cnki.net. A "Brief of the CN Office Action".

* cited by examiner

*Primary Examiner* — Anna Deng
(74) *Attorney, Agent, or Firm* — Yudell Isidore Ng Russell PLLC

(57) ABSTRACT

A method, system and computer-program product for deploying a package of objects in a learning management system. The method includes the steps of transmitting a Shareable Content Object Reference Model (SCORM) package to a SCORM Learning Management System (LMS); parsing out from the SCORM package a copy of a list of resources needed to deploy the SCORM package from the LMS; comparing names of all resources needed to deploy the SCORM package with an inventory of resources available to the LMS; in response to a name of one of the resources needed to deploy the SCORM package not matching any name in the inventory of resources available to the LMS, updating the name of the non-matching named resource to match a name of a resource in the inventory of resources available to the LMS; and deploying the SCORM package by launching the SCORM package with the corrected list of resources.

16 Claims, 14 Drawing Sheets

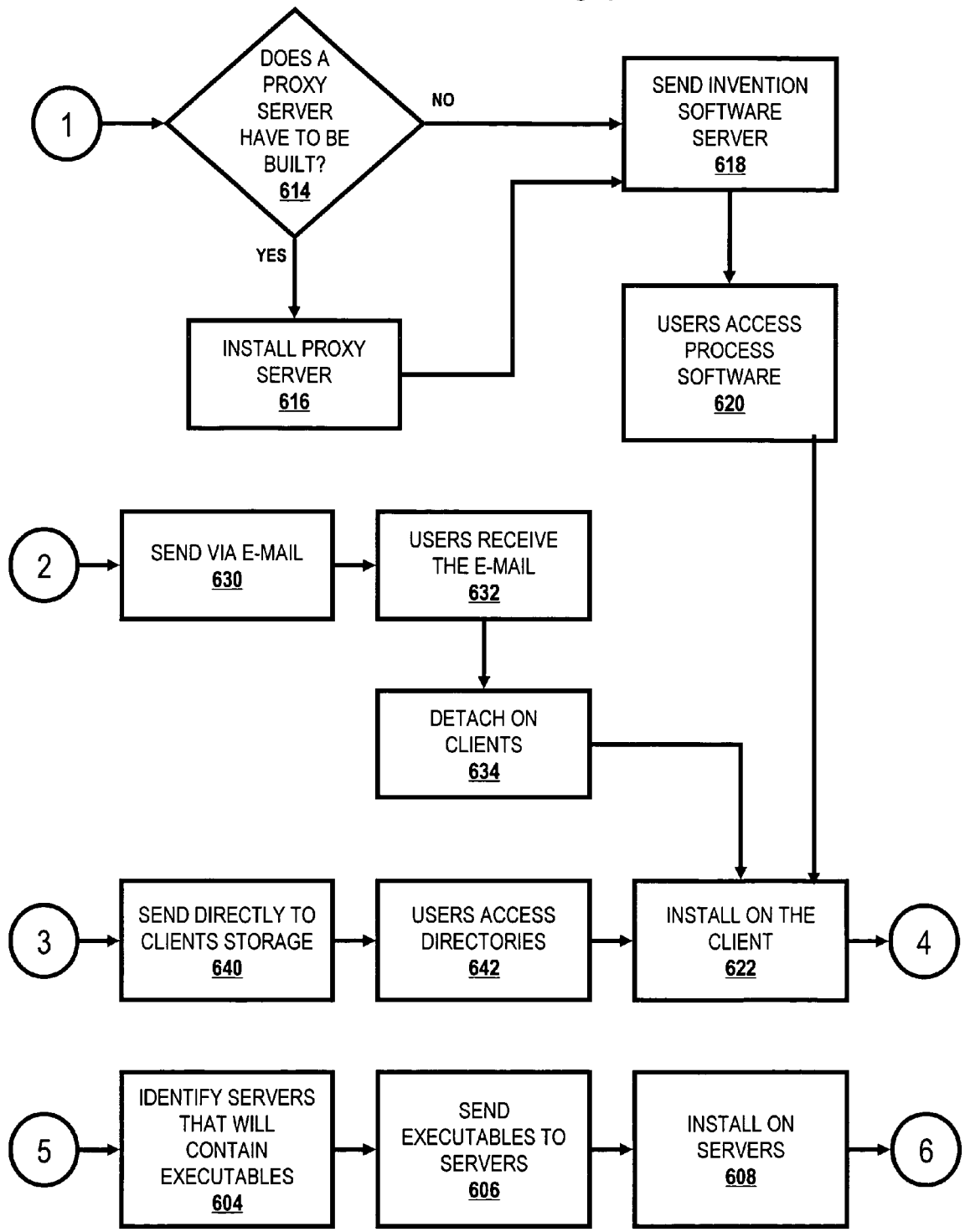

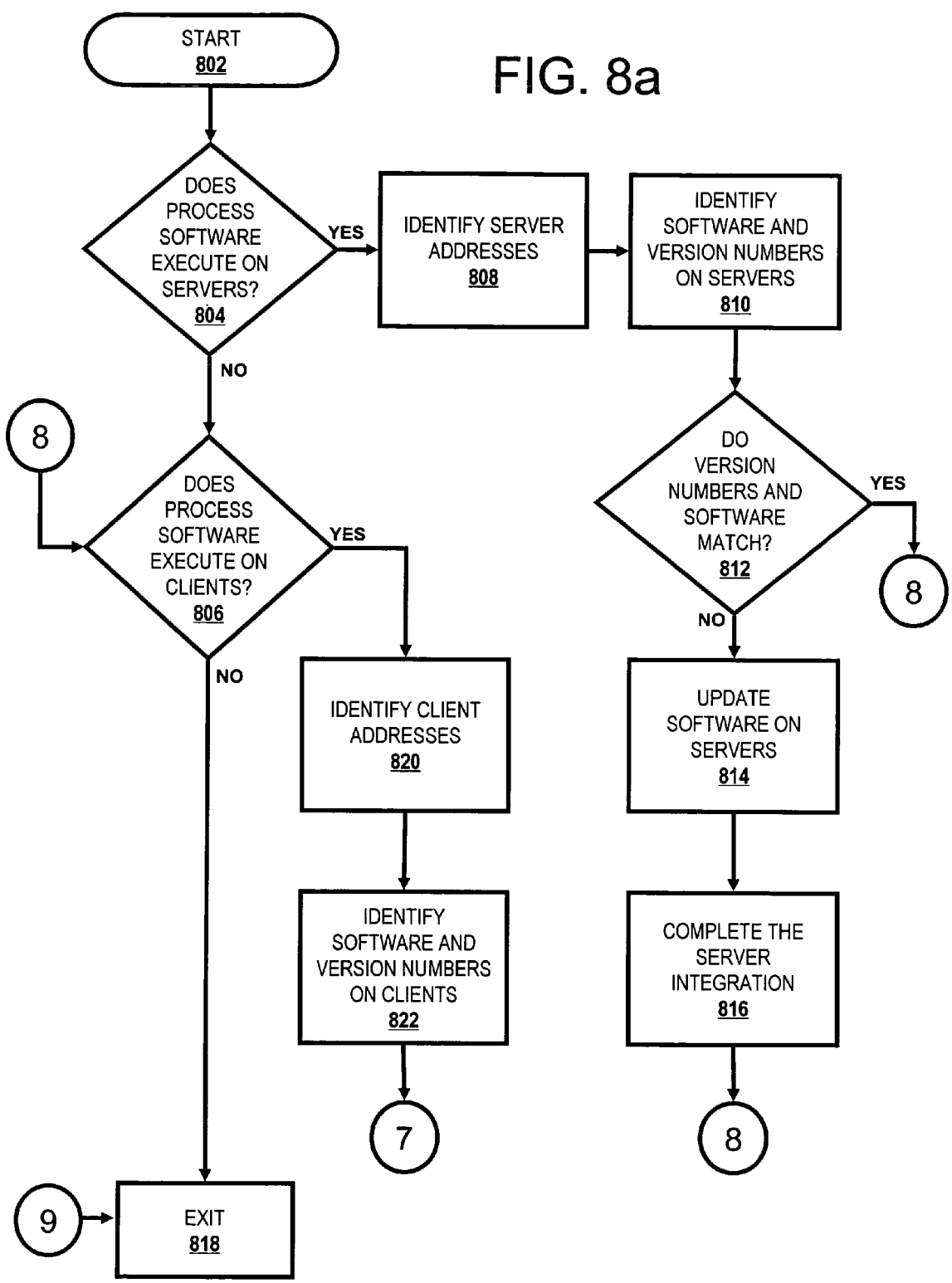

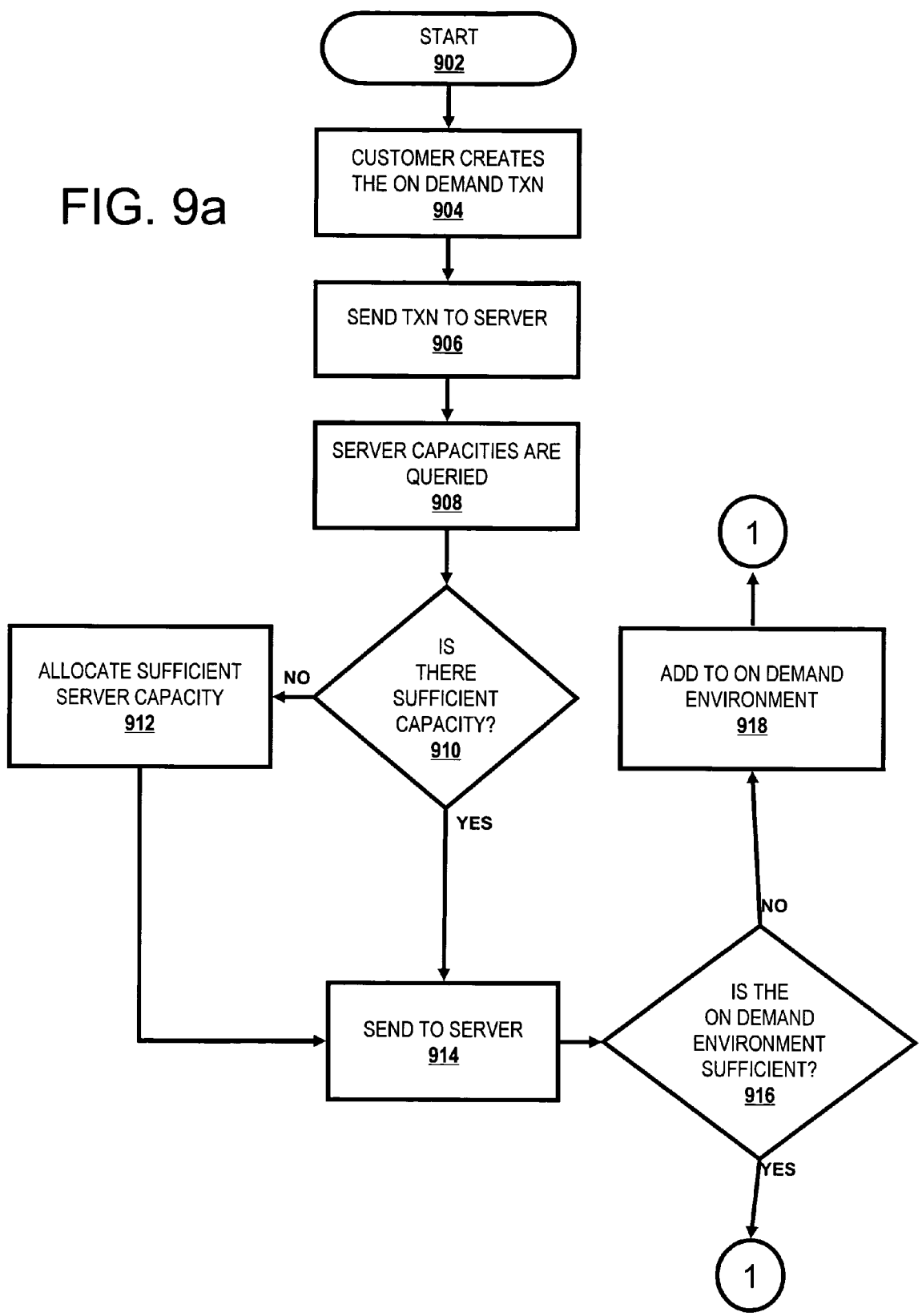

SCORM MANIFEST RECONCILIATION

BACKGROUND OF THE INVENTION

1. Technical Field

The present invention relates in general to the field of computers and similar technology systems, and in particular to software utilized by such systems to implement methods and processes. Still more particularly, the present invention relates to reconciliation of resource names in a SCORM environment.

2. Description of the Related Art

The Sharable Content Object Reference Model (SCORM) is an XML-based framework that is aimed at fostering the development of reusable learning content in "instructional objects" within a common framework for computer and Web-based learning. SCORM uses Shareable Content Objects (SCOs) and Learning Management Systems (LMSs) to deliver educational content to a student's computer. SCORM has been developed by the Advanced Distributed Learning (ADL) initiative, whose specification for SCORM is herein incorporated by reference in its entirety.

An SCO is a standardized reusable learning object that includes (either physically or by reference) a collection of one or more assets (e.g., a web page, graphic files, a document, audio/video files, etc.). One or more SCOs are packaged together as a course component, which is delivered to an LMS, which is software that automates the administration and delivery of the educational content for on-line learning. The LMS manages student registration and log-ins, manages course catalogs, records test results from on-line students, and prepares grade/progress reports.

Referring then to FIG. 1, a exemplary SCORM environment 100 is depicted. Multiple SCOs 102 are combined into a SCORM package 104, which is then sent to LMS 106 for delivery to a student's computer 108. The student's computer 108 is thus presented with the education content, which may include interactive videos, real-time video/audio feeds, web pages, written documents, graphic files, etc. LMS 106 also communicates with an educator's computer 110, providing grades, student registration information, etc. for the SCORM package 104 to a teacher/administrator using educator's computer 110.

Part of the SCORM package 104 is an imsmanifest.xml file 112. File 112 is an eXtensible Markup Language (XML) file that includes a listing of all resources that must be deployed/executed by LMS 106 in order for SCORM package 104 to properly run. Resources listed in imsmanifest.xml file 112 include, for example, graphic files, web pages, documents, Javascript files, etc. LMS 106 includes a package inventory 114 listing all resources available to LMS 106. When the SCORM package 104 is received by LMS 106, package inventory 114 is checked by 106, and resources are deployed and/or pointed to for use by SCORM package 104.

A problem with LMS 106, as presented in the SCORM specification referenced above, is that resources named in imsmanifest.xml file 112 must precisely match those resources found in package inventory 114. If the resource names do not match precisely, then a "404 File Not Found" error will be returned, and the SCORM package 104 is not able to deploy. When operating in a UNIX® environment, this matching precision includes casing (whether letters are in upper case or lower case). In a Windows® environment, casing is not an issue, since Windows® is not case sensitive. However, many SCORM packages are developed in a Windows® environment and thus, when transported over to a UNIX® environment, often have "404 File Not Found" errors pop up for the first time. Similarly, whether in Windows® or UNIX®, simple typographical errors (incorrect letters/numbers in a file name) can cause similar "404" errors to occur.

SUMMARY OF THE INVENTION

Recognizing the problems associated with LMS in the SCORM environment for finding proper resources, the present invention presents a computer-implementable method, system and computer-program product for deploying a package of objects in a learning management system. The method includes the steps of transmitting a Shareable Content Object Reference Model (SCORM) package to a SCORM Learning Management System (LMS); parsing out from the SCORM package a copy of a list of resources needed to deploy the SCORM package from the LMS; comparing names of all resources needed to deploy the SCORM package with an inventory of resources available to the LMS; in response to a name of one of the resources needed to deploy the SCORM package not matching any name in the inventory of resources available to the LMS, updating the name of the non-matching named resource to match a name of a resource in the inventory of resources available to the LMS; and deploying the SCORM package by launching the SCORM package with the corrected list of resources.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 6a-b show a flow-chart of steps taken to deploy software capable of executing the steps shown and described in FIGS. 2-3;

FIGS. 8a-b show a flow-chart showing steps taken to integrate into an computer system software that is capable of executing the steps shown and described in FIGS. 2-3; and FIGS. 9a-b show a flow-chart showing steps taken to execute the steps shown and described in FIGS. 2-3 using an on-demand service provider.

DETAILED DESCRIPTION OF THE PREFERRED EMBODIMENT

Figure 1:
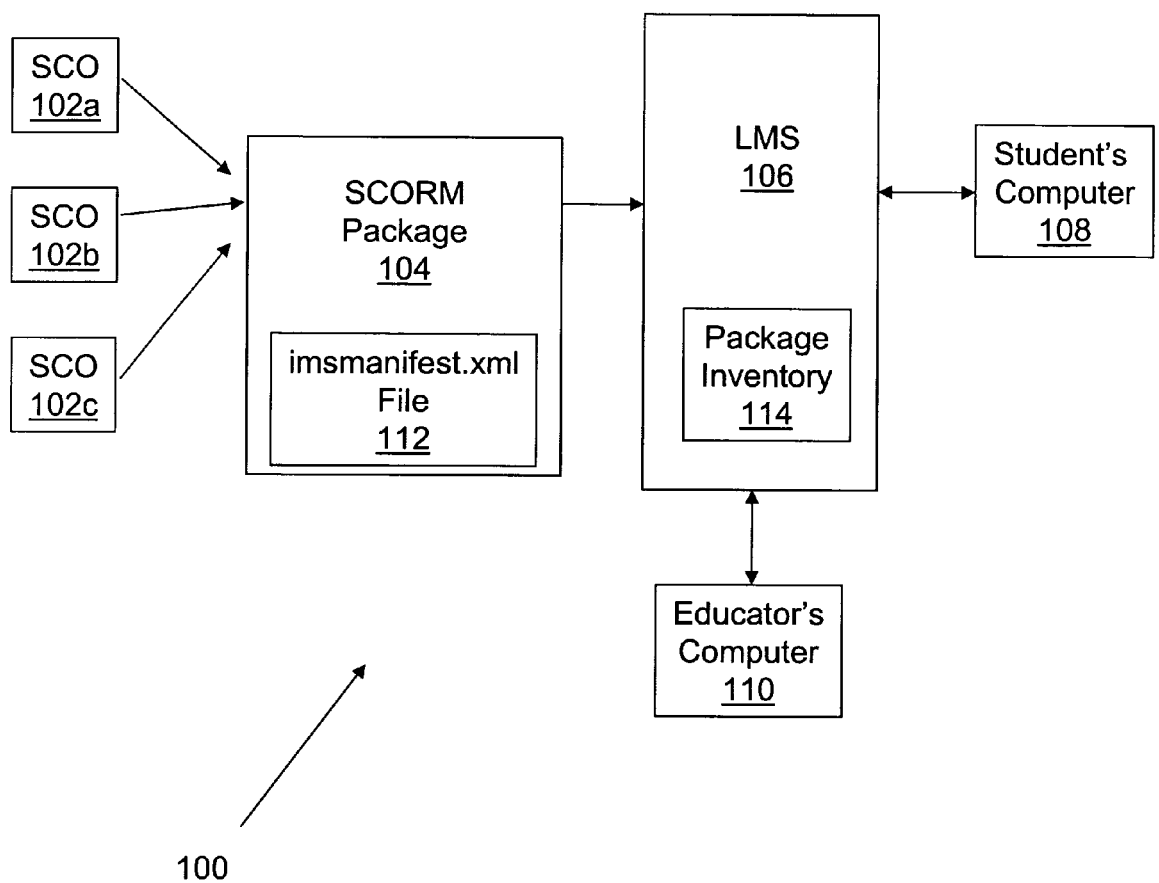
FIG. 1 depicts a prior art Shareable Content Object Reference Model (SCORM) environment.
Figure 2:
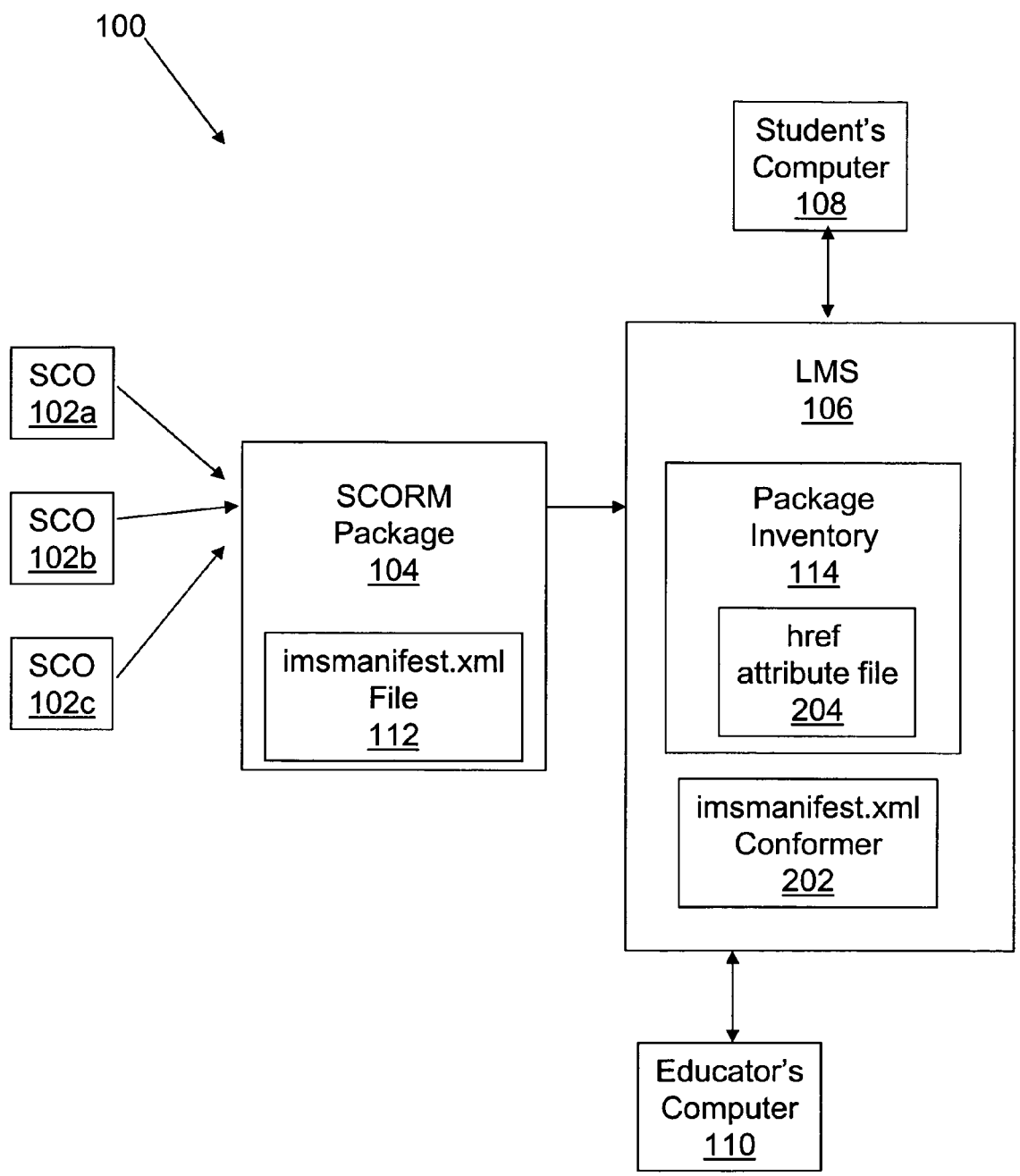
FIG. 2 illustrates a novel SCORM environment having a manifest conformer in a SCORM Learning Management System (LMS)

With reference now to FIG. 2, SCORM environment 100 is depicted with LMS 106 having an imsmanifest.xml file conformer 202. File conformer 202 causes non-conforming resources in imsmanifest.xml file 112 to be amended to come into conformance with resources available to LMS 106 (as found in package inventory 114).

Figure 3:
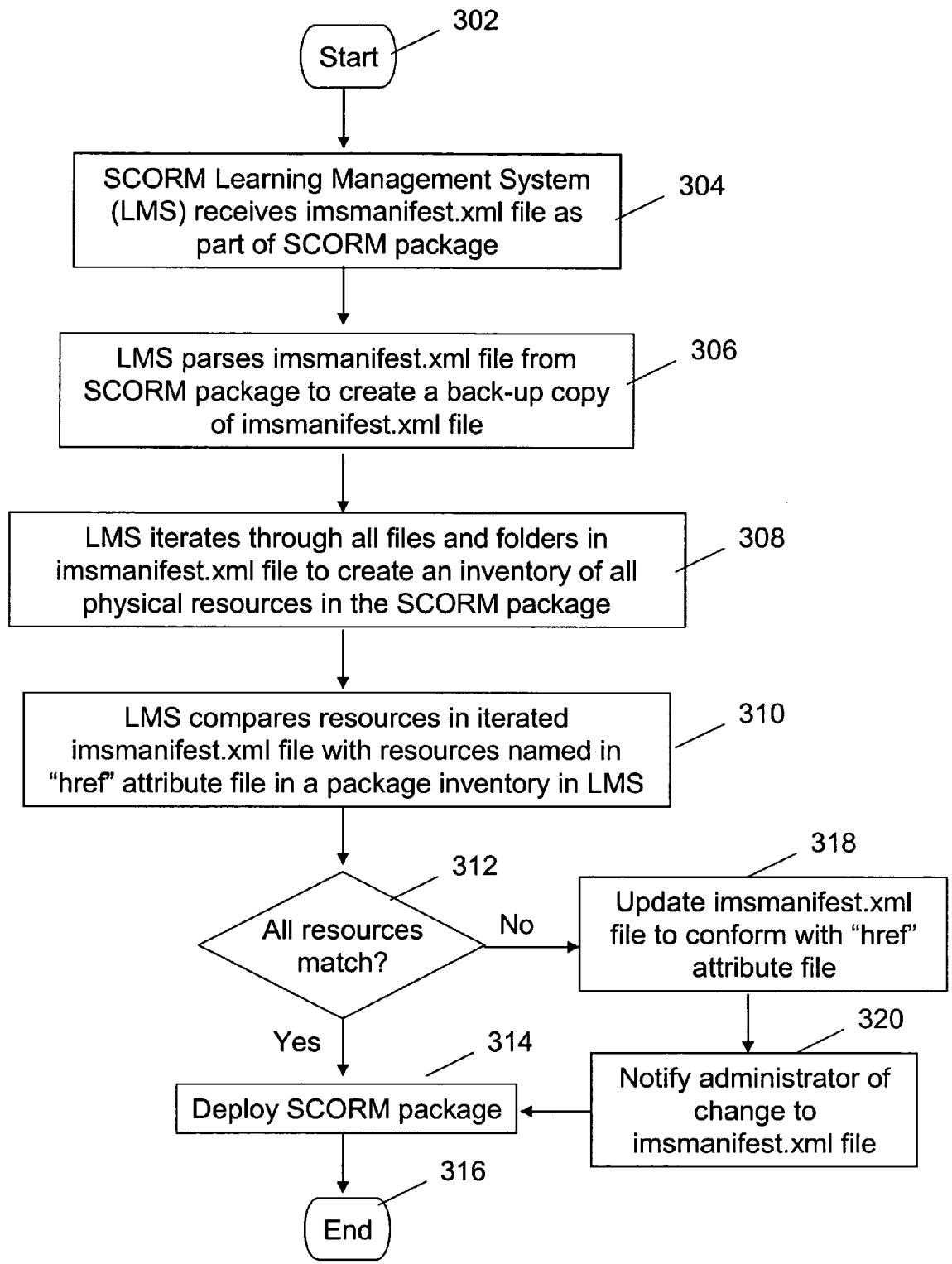
FIG. 3 depicts a flow-chart of exemplary steps taken to conform a manifest in a SCORM message with resources available to the SCORM LMS.

Steps taken in an exemplary embodiment of the present invention are shown in FIG. 3. After initiator block 302, SCORM LMS 106 receives a SCORM package 104. Within SCORM package 104 is a manifest listing of resources needed by SCORM package 104 to properly execute. This manifest listing is an XML file named "imsmanifest.xml" according to the SCORM specification.

In order to have a non-executable non-corruptible copy of "imsmanifest.xml" to work with, LMS 106 parses out a copy of "imsmanifest.xml" from the SCORM package 104 to create a back-up copy of "imsmanifest.xml" (block 306). LMS 106 then iterates (inspects) through all files and folders in the "imsmanifest.xml" file to create an inventory listing of all resources (e.g., web pages, Javascript files, documents, drivers, graphics files, audio files, etc.) needed by SCORM package 104 to properly execute (block 308).

LMS then compares all resources identified by the iteration of the "imsmanifest.xml" file with those known to be available to LMS 106, according to their presence in the "href" attribute file 204 in a package inventory 202 in LMS 106 (block 310). If all of the resource names found in "imsmanifest.xml" match resource names found in the "href" attribute file (query block 312), then the SCORM package is deployed with no further steps taken (block 314), and the steps end (terminator block 316).

However, the resource names may not match. For example, some of the characters in the "imsmanifest.xml" file may be in upper/lower case, which casing does not match the same characters in the "href" attribute file. This scenario of non-matching casing is especially prevalent when the SCORM package was originally created in a Windows® environment, which is casing agnostic. In UNIX®, however, such non-conforming casing (upper/lower case of characters) is fatal to LMS 106 when trying to find the named resource. Similarly, there may be another typographical error (substituting one character for another entirely different character—irrespective of casing) in the "imsmanifest.xml" file. That is, the name of the non-matching named resource may fail to match the name of the resource in the inventory of resources available to the LMS due to one or more of the characters in the names being different ASCII characters (e.g., "a" instead of "e"). While slower and requiring additional logic, these errors may also be caught and corrected by "imsmanifest.xml" conformer 202. Thus, as described in block 318, resource names in the "imsmanifest.xml" back-up copy file (created in the step described in block 306) that do not match perfectly with the resource names in the "href" attribute file in package inventory 114 are autocorrected in the original "imsmanifest.xml" file received in SCORM package 104 (block 318). A system administrator is notified of the correction in a log file (block 320), and the SCORM package is deployed (block 314).

Figure 4:
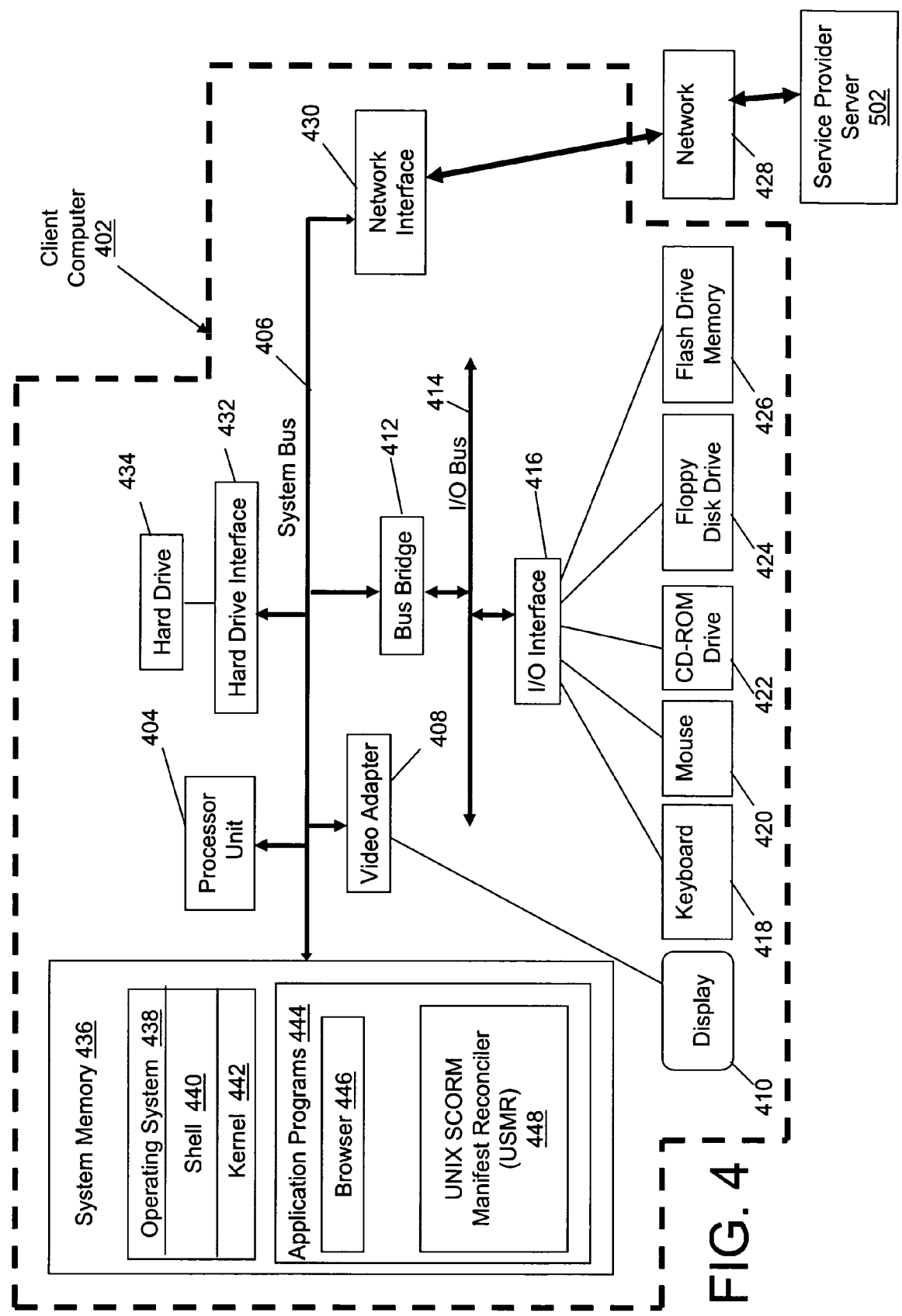
FIG. 4 illustrates an exemplary computer in which the present invention may be implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a UNIX SCORM Manifest Reconciler (USMR) 448.

USMR 448 includes code for implementing the processes described in FIGS. 2-3. In one embodiment, client computer 402 is able to download USMR 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
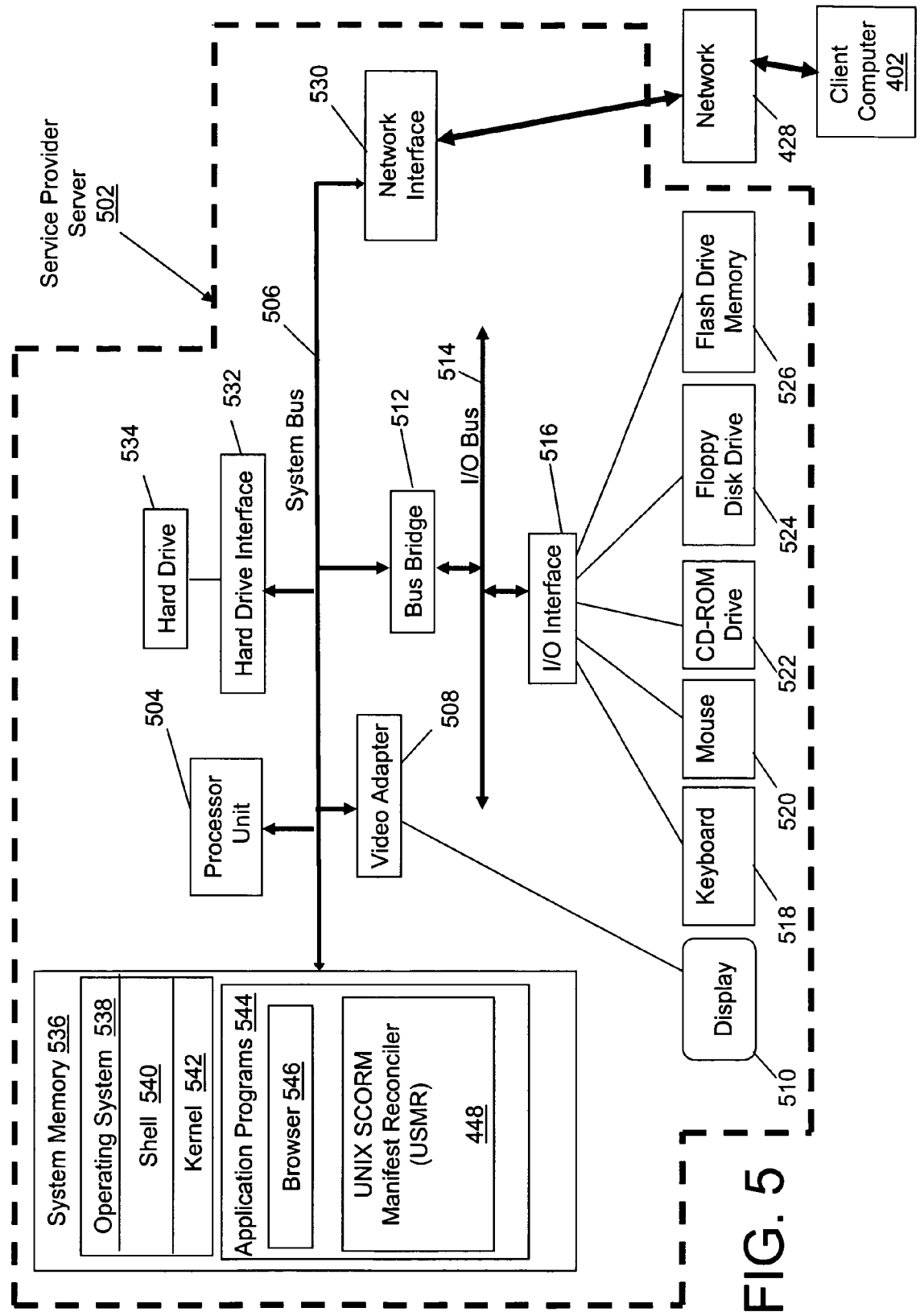
FIG. 5 depicts an exemplary server from which software for executing the present invention may be deployed.

As noted above, USMR 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506.

Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download USMR 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of USMR 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of USMR 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 2-3, can be deployed as a process software from service provider server 502 (shown in FIG. 5) to client computer 402 (shown in FIG. 4).

Figure 6A:
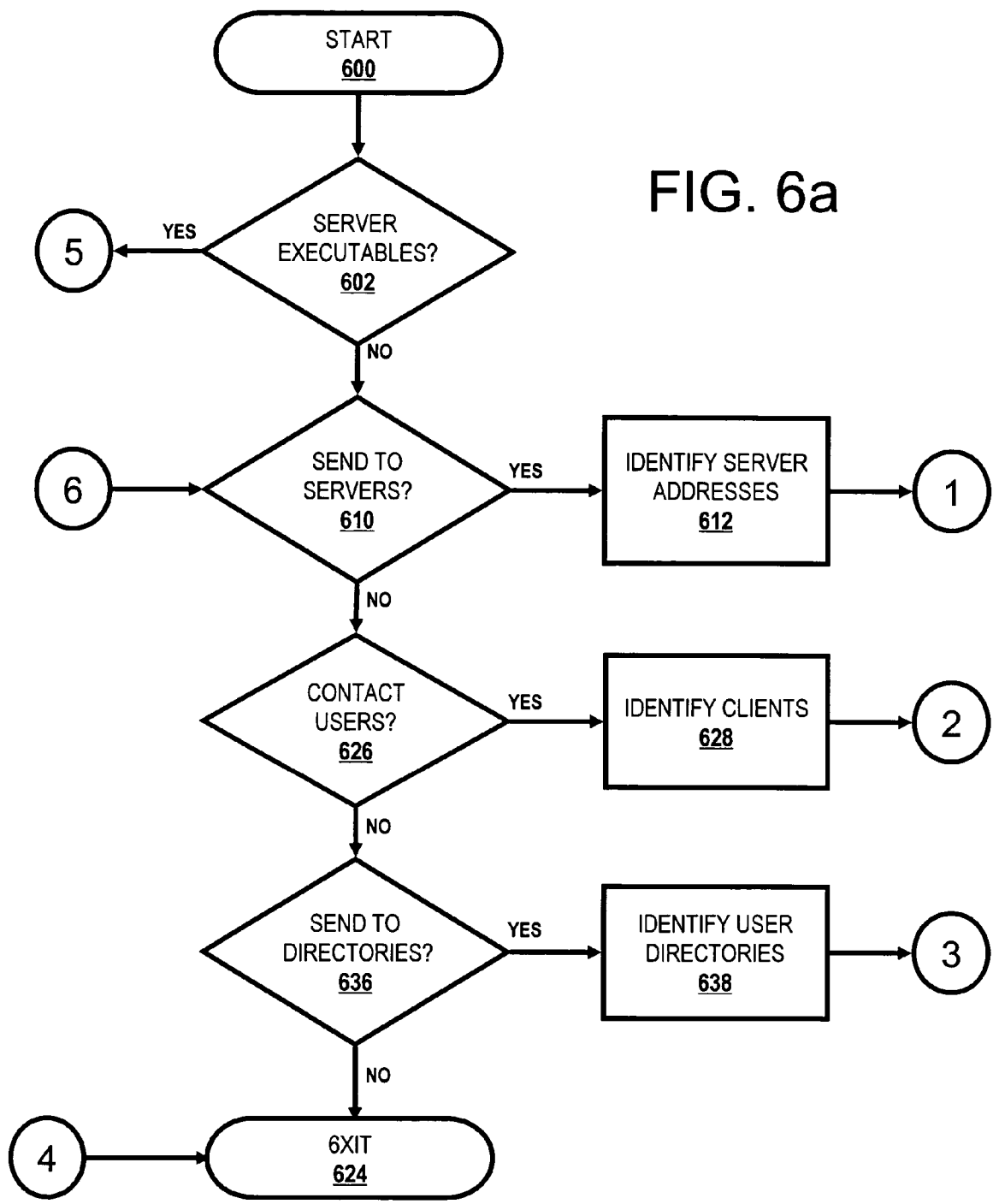

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
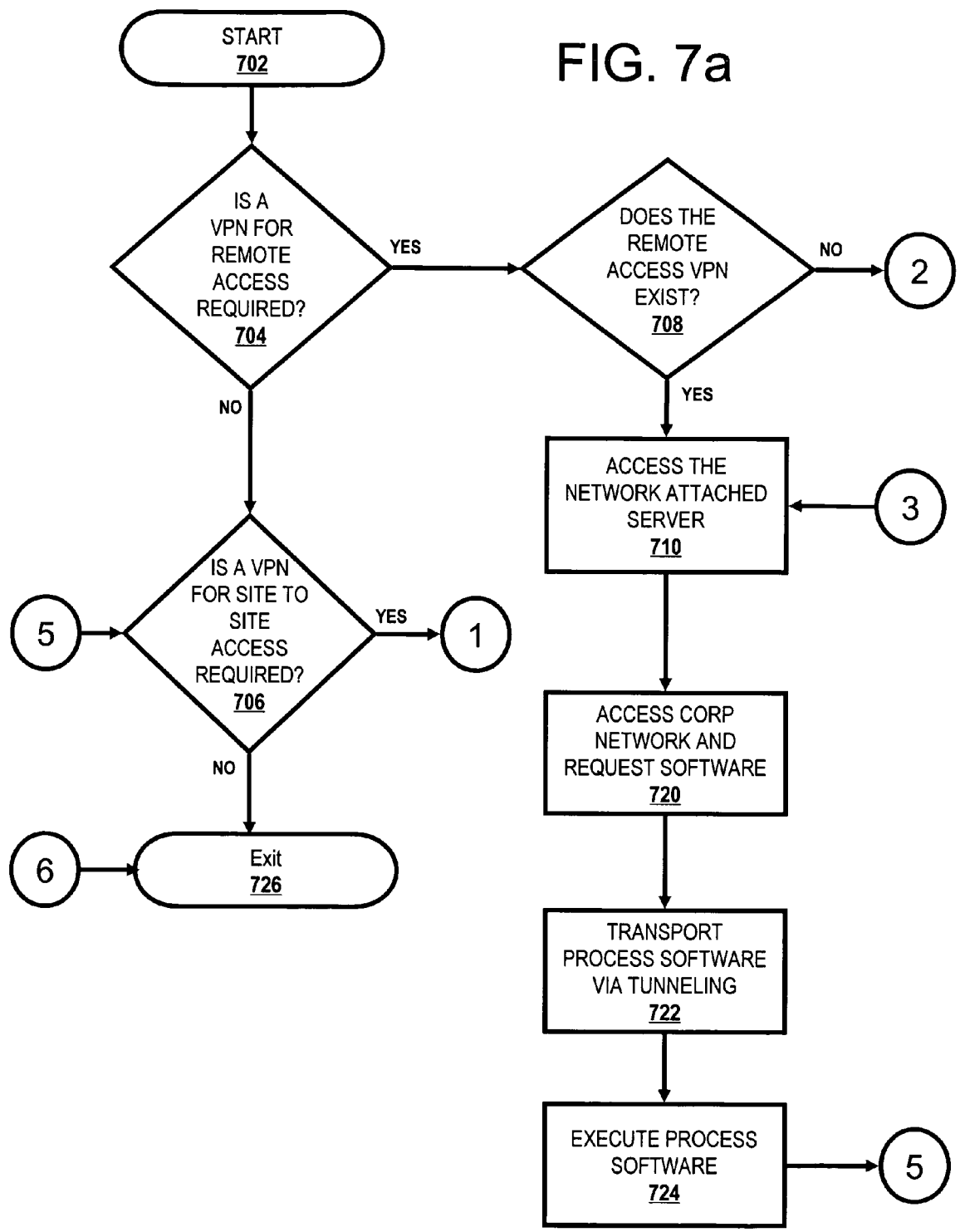
FIGS. 7a-c show a flow-chart of steps taken to deploy in a Virtual Private Network (VPN) software that is capable of executing the steps shown and described in FIGS. 2-3.
Figure 7B:
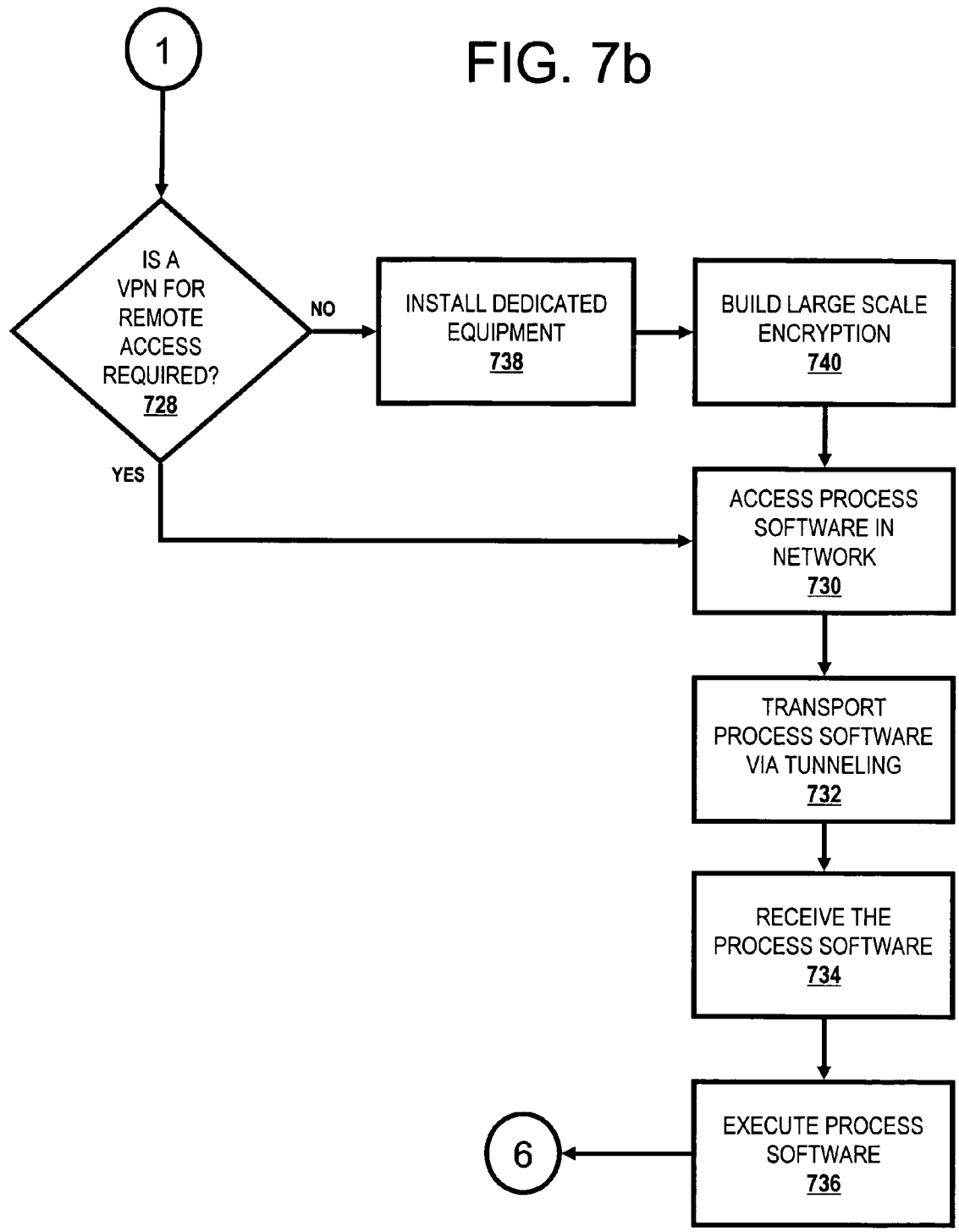
Figure 7C:
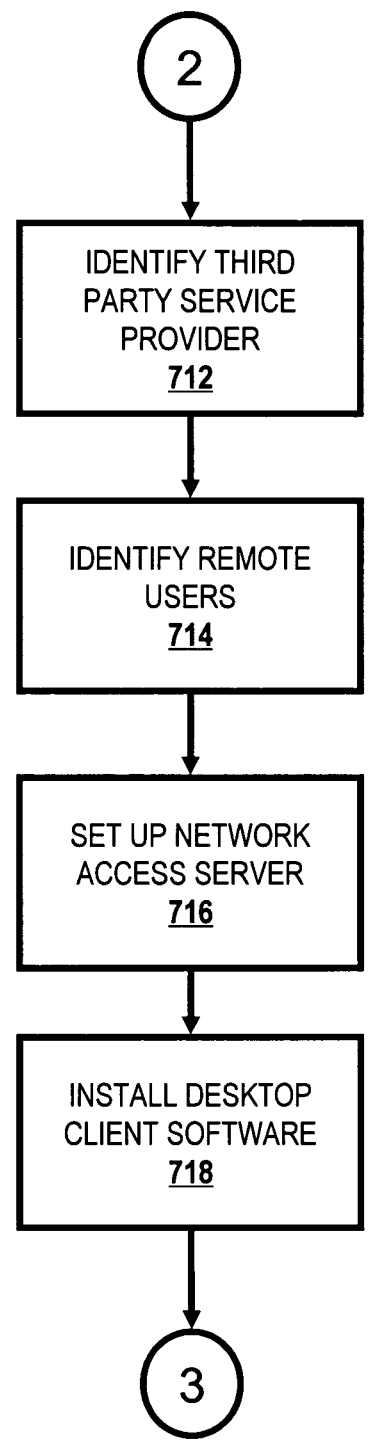

The process for such VPN deployment is described in FIG. 7. Initiator block 702 begins the Virtual Private Network (VPN) process. A determination is made to see if a VPN for remote access is required (query block 704). If it is not required, then proceed to query block 706. If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it has been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process software is divided into packets and each packet including the data and protocol is placed within another packet (block 722). When the process software arrives at the remote user's desktop, it is removed from the packets, reconstituted and then is executed on the remote user's desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site user's desktop (block 736). The process then ends at terminator block 726.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8B:
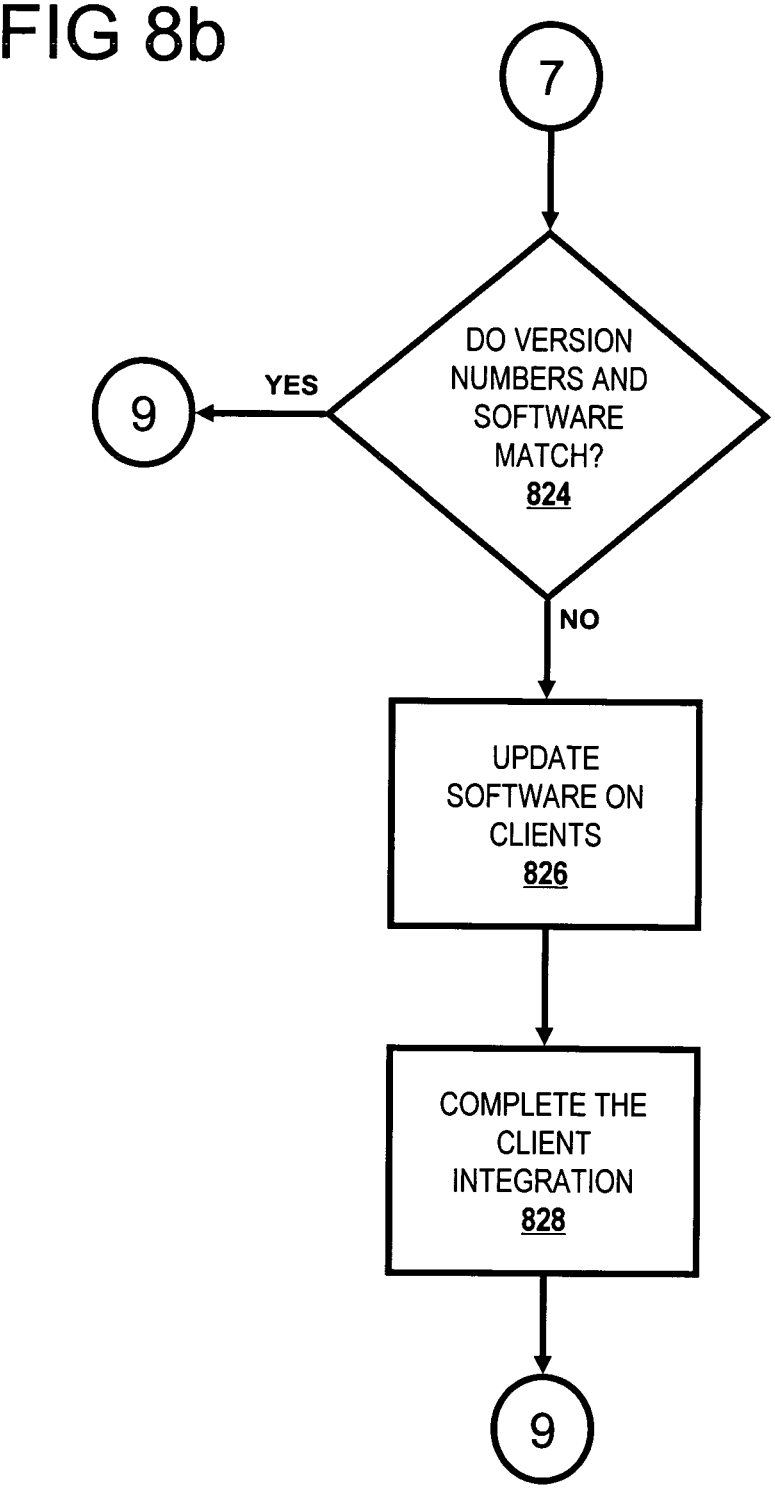

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9B:
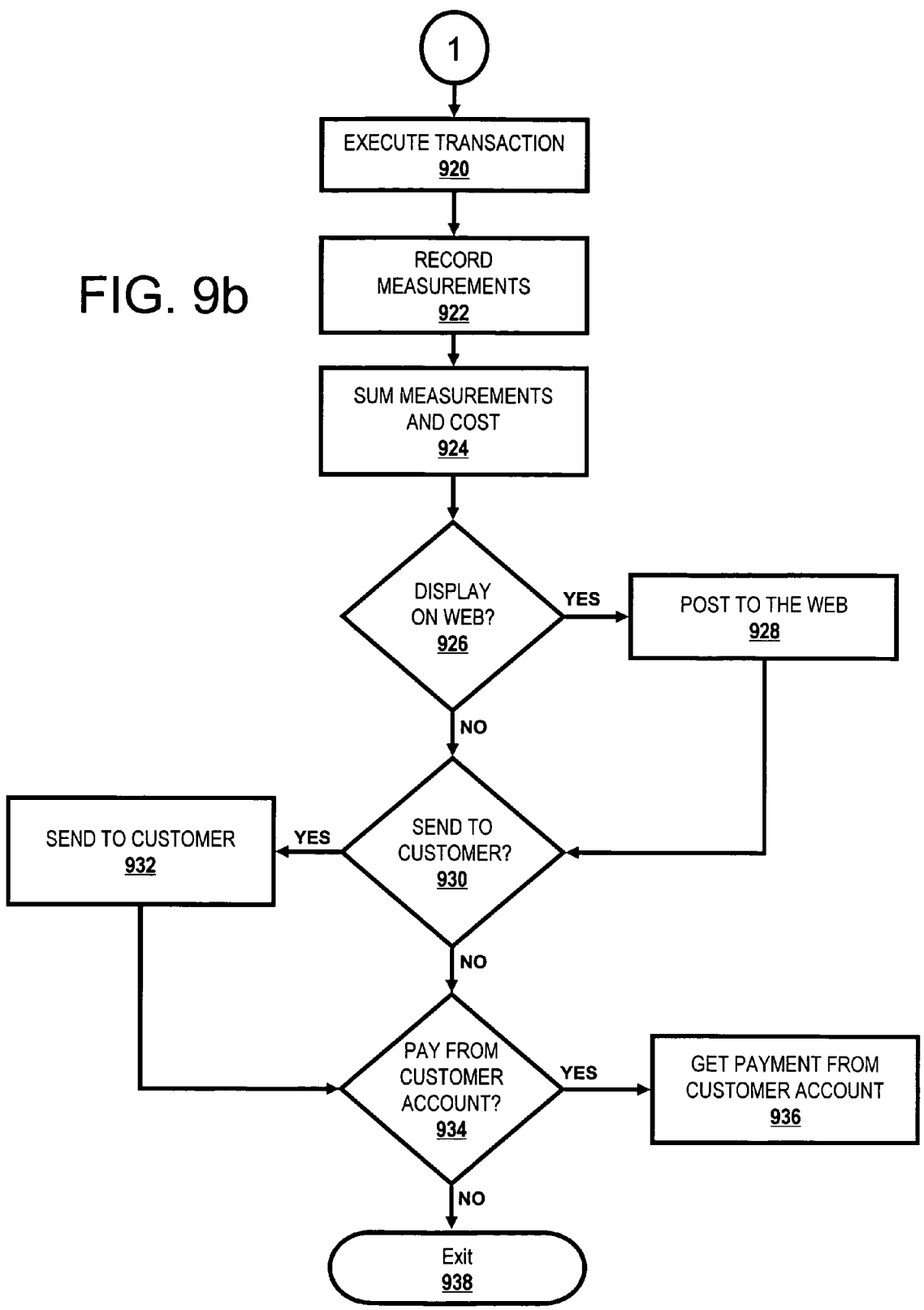

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of deploying a package of objects in a learning management system, the method comprising:
    transmitting a Shareable Content Object Reference Model (SCORM) package to a SCORM Learning Management System (LMS), wherein the SCORM package includes a manifest listing of resources needed to deploy the SCORM package from the LMS;
    parsing out the manifest listing from the SCORM package;
    iterating through the manifest listing to create an inventory of the resources in the SCORM package, wherein the inventory of the resources includes an attribute file;
    comparing names of all resources in the manifest listing with named resources in the attribute file in the inventory of resources available to the LMS;
    in response to a name in the manifest listing not completely matching any named resources in the attribute file in the inventory of resources available to the LMS, updating a character casing of the name to match a character casing of a corresponding name of a named resource in the attribute file in the inventory of resources available to the LMS, wherein the character casing of the corresponding name of the named resource includes one or more upper case letters and one or more lower case letters; and
    deploying the SCORM package by launching the SCORM package with a corrected list of resources matching the attribute file in the inventory of resource available to the LMS.

2. The method of claim 1, wherein the manifest listing of resources needed to deploy the SCORM package is located in a SCORM "imsmanifest.xml" file that is part of the SCORM package.

3. The method of claim 1, wherein one of the resources needed to deploy the SCORM package is a driver.

4. The method of claim 1, wherein one of the resources needed to deploy the SCORM package is a Javascript file.

5. A system comprising:
    a processor;
    a data bus coupled to the processor; and
    a computer-usable memory embodying computer program code, the computer-usable memory being coupled to the data bus, the computer program code comprising instructions executable by the processor and configured for:
        transmitting a Shareable Content Object Reference Model (SCORM) package to a SCORM Learning Management System (LMS), wherein the SCORM package includes a manifest listing of resources needed to deploy the SCORM package from the LMS;
        parsing out the manifest listing from the SCORM package;
        iterating through the manifest listing to create an inventory of the resources in the SCORM package, wherein the inventory of the resources includes an attribute file;
        comparing names of all resources in the manifest listing with named resources in the attribute file in the inventory of resources available to the LMS;
        in response to a name in the manifest listing not completely matching any named resources in the attribute file in the inventory of resources available to the LMS, updating a character casing of the name to match a character casing of a corresponding name of a named resource in the attribute file in the inventory of resources available to the LMS, wherein the character casing of the corresponding name of the named resource includes one or more upper case letters and on or more lower case letters; and
        deploying the SCORM package by launching the SCORM package with a corrected list of resources matching the attribute file in the inventory of resource available to the LMS.

6. The system of claim 5, wherein the manifest listing of resources needed to deploy the SCORM package is located in a SCORM "imsmanifest.xml" file that is part of the SCORM package.

7. The system of claim 5, wherein one of the resources needed to deploy the SCORM package is a driver.

8. The system of claim 5, wherein one of the resources needed to deploy the SCORM package is a web page.

9. The system of claim 5, wherein one of the resources needed to deploy the SCORM package is a Javascript file.

10. A computer-usable memory embodying computer program code, the computer program code comprising computer executable instructions configured for:
    transmitting a Shareable Content Object Reference Model (SCORM) package to a SCORM Learning Management System (LMS), wherein the SCORM package includes a manifest listing of resources needed to deploy the SCORM package from the LMS;
    parsing out the manifest listing from the SCORM package;
    iterating through the manifest listing to create an inventory of the resources in the SCORM package, wherein the inventory of the resources includes an attribute file;
    comparing names of all resources in the manifest listing with named resources in the attribute file in the inventory of resources available to the LMS;
    in response to a name in the manifest listing not completely matching any named resources in the attribute file in the inventory of resources available to the LMS, updating a character casing of the name to match a character casing of a corresponding name of a named resource in the attribute file in the inventory of resources available to the LMS, wherein the character casing of the corresponding name of the named resource includes one or more upper case letters and on or more lower case letters; and
    deploying the SCORM package by launching the SCORM package with a corrected list of resources matching the attribute file in the inventory of resource available to the LMS.

11. The computer-useable memory of claim 10, wherein the manifest listing of resources needed to deploy the SCORM package is located in a SCORM "imsmanifest.xml" file that is part of the SCORM package.

12. The computer-useable memory of claim 10, wherein one of the resources needed to deploy the SCORM package is a driver.

13. The computer-useable memory of claim 10, wherein one of the resources needed to deploy the SCORM package is a web page.

14. The computer-useable memory of claim 10, wherein one of the resources needed to deploy the SCORM package is a Javascript file.

15. The computer-useable memory of claim 10, wherein the computer program code is deployed to a client computer from a server at a remote location.

16. The computer-useable memory of claim 10, wherein the computer program code is provided by a service provider to a customer on an on-demand basis.

\* \* \* \* \*